(12) United States Patent
Gong et al.

(10) Patent No.: US 12,228,646 B2
(45) Date of Patent: Feb. 18, 2025

(54) LIDAR CONTROLLING METHOD AND DEVICE, ELECTRONIC APPARATUS AND STORAGE MEDIUM

(71) Applicant: SUTENG INNOVATION TECHNOLOGY CO., LTD., Shenzhen (CN)

(72) Inventors: Changsheng Gong, Shenzhen (CN); Xi Feng, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/592,502

(22) Filed: Feb. 29, 2024

(65) Prior Publication Data

US 2024/0201375 A1 Jun. 20, 2024

Related U.S. Application Data

(63) Continuation of application No. 18/085,523, filed on Dec. 20, 2022, now Pat. No. 11,947,012.

(30) Foreign Application Priority Data

Dec. 23, 2021 (CN) .......................... 202111595865.3

(51) Int. Cl.
*G01S 17/14* (2020.01)
*G01S 7/481* (2006.01)
(Continued)

(52) U.S. Cl.
CPC ............ *G01S 17/14* (2020.01); *G01S 7/4815* (2013.01); *G01S 7/4861* (2013.01); *G01S 7/497* (2013.01)

(58) Field of Classification Search
CPC ...... G01S 17/14; G01S 7/4815; G01S 7/4861; G01S 7/497
(Continued)

(56) References Cited

U.S. PATENT DOCUMENTS

| 10,983,197 B1 | 4/2021 | Zhu et al. |
| 11,016,193 B2 | 5/2021 | Pacala et al. |
| 2020/0309955 A1 | 10/2020 | Laflaquière et al. |

OTHER PUBLICATIONS

First Office Action issued in related Chinese Application No. 202111595865.3, mailed Aug. 23, 2023, 8 pages.
(Continued)

*Primary Examiner* — Nguyen T Truong
(74) *Attorney, Agent, or Firm* — BAYES PLLC

(57) ABSTRACT

The present application discloses a LiDAR controlling method and device, an electronic apparatus, and a storage medium. The method includes: in a measurement period, determining an emitting group to be started in the measurement period from a laser emitting array, where the emitting group includes at least two emitting units, and physical positions of the at least two emitting units meet a condition of no optical crosstalk; controlling the at least two emitting units to emit laser beams asynchronously based on a preset rule; controlling a receiving unit group of the laser receiving array corresponding to the emitting group to receive laser echoes, where the laser echoes refer to echoes formed after the laser beams are reflected by a target object; and when at least two emitting groups are determined in the measurement period, controlling the emitting groups to emit the laser beams asynchronously based on the preset rule.

9 Claims, 9 Drawing Sheets

(51) Int. Cl.
*G01S 7/4861* (2020.01)
*G01S 7/497* (2006.01)
(58) Field of Classification Search
USPC ........................................................ 356/4.01
See application file for complete search history.

(56) References Cited

OTHER PUBLICATIONS

European Search Report issued in related European Application No. EP22215481.7, mailed Apr. 21, 2023, 10 pages.

LIDAR CONTROLLING METHOD AND DEVICE, ELECTRONIC APPARATUS AND STORAGE MEDIUM

CROSS-REFERENCE TO RELATED APPLICATION

The present application is a continuation of application Ser. No. 18/085,523, filed on Dec. 20, 2022, the entire contents of all of which are hereby incorporated herein by reference. The present application is also related to and claims the benefit of priority to China Patent Application No. CN 202111595865.3, filed on Dec. 23, 2021, the content of which is incorporated herein by reference in its entirety.

TECHNICAL FIELD

The present application relates to the technical field of laser detection, and particularly, to a LiDAR controlling method and device, an electronic apparatus, and a storage medium.

TECHNICAL BACKGROUND

An array LiDAR consists of a laser emitting array and a laser receiving array. The laser emitting array consists of a plurality of emitting units. Likewise, the laser receiving array consists of a plurality of receiving units.

When the array LiDAR is used for detection, if a single emitting unit is used for emission, it takes a long time to scan all arrays, which makes an overall scanning frame rate very low. However, when a plurality of emitting blocks are used for emission at the same time, optical crosstalk is caused between the different emitting blocks, which makes it impossible to obtain an accurate measurement result.

SUMMARY

Embodiments of the present application provide a LiDAR controlling method and device, an electronic apparatus, and a storage medium, which can improve an overall scanning frame rate, prevent optical crosstalk, and improve the accuracy of measurement results.

The technical solution is as follows.

In a first aspect, there is provided a LiDAR controlling method. The LiDAR includes a laser emitting array and a laser receiving array. The method includes:

in a measurement period, determining an emitting group to be started in the measurement period from a laser emitting array, where the emitting group includes at least two emitting units, and physical positions of the at least two emitting units meet a condition of no optical crosstalk;

controlling the at least two emitting units to emit laser beams asynchronously based on a preset rule; and controlling a receiving unit group of the laser receiving array corresponding to the emitting group to receive laser echoes, where the laser echoes refer to echoes formed after the laser beams are reflected by a target object.

As an example of the present application, controlling the at least two emitting units to emit a laser beam asynchronously based on a preset rule includes:

according to a time coding sequence corresponding to an emitting unit of a $k^{th}$ emission in the at least two emitting units, controlling the emitting unit of the $k^{th}$ emission to emit the laser beam at a corresponding time, where K is an integer greater than or equal to 1; and after a first preset duration threshold expires, according to a time coding sequence corresponding to an emitting unit of a $(K+1)^{th}$ emission, controlling the emitting unit of the $(K+1)^{th}$ emission to emit the laser beam at the corresponding time.

As an example of the present application, a method for determining the time coding sequence corresponding to any one of the emitting units in the emitting group includes:

based on a first preset sequence, generating a series of pseudo-random sequences via a linear feedback shift register to obtain the plurality of pseudo-random sequences;

determining an autocorrelation function of each of the plurality of pseudo-random sequences;

according to the autocorrelation function, screening, from the plurality of pseudo-random sequences, the pseudo-random sequence whose autocorrelation coefficient is less than a first specified threshold; and selecting a pseudo-random sequence from the at least one screened pseudo-random sequence as the time coding sequence corresponding to any one of the emitting units.

As an example of the present application, the method includes: when the at least two emitting groups are present in one measurement period, controlling the at least two emitting groups to emit the laser beam asynchronously based on the preset rule, where controlling the receiving unit group of the laser receiving array corresponding to the emitting group to receive the laser echo includes:

controlling the receiving unit group of the laser receiving array corresponding to each of the at least two emitting groups respectively to receive the laser echoes.

As an example of the present application, controlling the at least two emitting groups to emit the laser beams asynchronously based on the preset rule includes:

sequentially controlling each of the at least two emitting groups to emit the laser beams according to a preset emitting timing sequence, where an emitting time of a first emitting unit of each of the at least two emitting groups in the same measurement period has an emitting time interval of a second preset duration threshold.

As an example of the present application, the physical positions of the at least two emitting units meet the condition of no optical crosstalk, and controlling the at least two emitting groups to emit the laser beams asynchronously based on the preset rule includes:

controlling each of the at least two emitting groups to emit laser beams in parallel, where the emitting units in the same emitting order in the at least two emitting groups emit laser beams based on time coding sequences corresponding to the emitting units. A cross-correlation coefficient between the time coding sequences corresponding to the emitting units in the same emitting order in the adjacent emitting groups is less than a second specified threshold.

As an example of the present application, a physical positional relationship of the at least two emitting units is determined according to power, an angle of view, and a detection distance of each of the at least two emitting units.

In a second aspect, there is provided a LiDAR controlling device. The LiDAR includes a laser emitting array and a laser receiving array. The device includes:

a determining module, configured to determine, in one measurement period, an emitting group to be started in the current measurement period from the laser emitting array, where the emitting group includes at least two emitting units and physical positions of the at least two emitting units meet a condition of no optical crosstalk;

a first control module, configured to control the at least two emitting units to emit laser beams asynchronously based on a preset rule; and a second control module, configured to control a receiving unit group of the laser receiving array corresponding to the emitting group to receive a laser echo, where the laser echo refers to an echo formed after the laser beam is reflected by a target object.

As an example of the present application, the first control module is configured to:

according to a time coding sequence corresponding to an emitting unit of a $k^{th}$ emission in the at least two emitting units, control the emitting unit of the $k^{th}$ emission to emit the laser beam at a corresponding time, where K is an integer greater than or equal to 1; and after a first preset duration threshold expires, according to a time coding sequence corresponding to an emitting unit of a $(K+1)^{th}$ emission, control the emitting unit of the $(K+1)^{th}$ emission to emit the laser beam at the corresponding time.

As an example of the present application, the determining module is further configured to:

based on a first preset sequence, generate a series of pseudo-random sequences via a linear feedback shift register to obtain the plurality of pseudo-random sequences;

determine an autocorrelation function of each of the plurality of pseudo-random sequences;

according to the autocorrelation function, screen, from the plurality of pseudo-random sequences, the pseudo-random sequence whose autocorrelation coefficient is less than a first specified threshold; and select a pseudo-random sequence from the at least one screened pseudo-random sequence as the time coding sequence corresponding to any one of the emitting units.

As an example of the present application, when there are at least two emitting groups in a measurement period, the first control module is further configured to control the at least two emitting groups to emit the laser beam asynchronously based on the preset rule.

The second control module is configured to:

control the receiving unit group of the laser receiving array corresponding to each of the at least two emitting groups respectively to receive the laser echo.

As an example of the present application, the first control module is configured to:

sequentially control each of the at least two emitting groups to emit the laser beam according to a preset emitting timing sequence, where an emitting time of a first emitting unit of each of the at least two emitting groups in the same measurement period has an emitting time interval of a second preset duration threshold.

As an example of the present application, the physical positions of the at least two emitting units meet the condition of no optical crosstalk. The first control module is configured to:

control each of the at least two emitting groups to emit laser beams in parallel, where the emitting units in the same emitting order in the at least two emitting groups emit laser beams based on time coding sequences corresponding to the emitting units, and a cross-correlation coefficient between the time coding sequences corresponding to the emitting units in the same emitting order in the adjacent emitting groups is less than a second specified threshold.

As an example of the present application, a physical positional relationship of the at least two emitting units is determined according to power, an angle of view, and a detection distance of each of the at least two emitting units.

In a third aspect, an electronic apparatus is provided. The electronic apparatus includes a storage, a processor, and a computer program that is stored in the memory and capable of running on the processor. The processor implements the method in any embodiment of the first aspect when executing the computer program.

In a fourth aspect, a computer-readable storage medium is provided. The computer-readable storage medium stores an instruction. When the instruction is executed by a processor, the method in any embodiment of the first aspect is implemented.

In a fifth aspect, a computer program product including an instruction is provided. When the instruction runs on a computer, the computer executes the method in any embodiment of the first aspect.

The technical solution provided in the embodiment of the application brings the following beneficial effects.

In one measurement period, the emitting group to be started in the current measurement period from the laser emitting array is determined. The emitting group includes the at least two emitting units. The physical positions of the at least two emitting units meet the condition of no optical crosstalk. The at least two emitting units are controlled to emit the laser beam asynchronously based on the preset rule. The receiving unit group of the laser receiving array corresponding to the emitting group is controlled to receive the laser echo. The laser echo refers to the echo formed after the laser beam is reflected by the target object. Thus, in the present application, in the measurement period, the at least two emitting units are controlled to emit the laser beams at different times, which not only avoids the optical crosstalk, but also ensures a high scanning frame rate. That is, in the method provided in the present application, problems of the optical crosstalk and the frame rate of an array LiDAR can be both solved, so that measurement results can be accurately determined.

BRIEF DESCRIPTION OF DRAWINGS

To explain embodiments of this application or the technical solutions more clearly, the following briefly introduces the drawings used in the embodiments. The drawings in the following description are only some embodiments of the present application. The person skilled in the art can obtain other drawings based on these drawings without creative labor.

DETAILED DESCRIPTION

To make objectives, technical solutions, and advantages of the present application clearer, embodiments of the present application are described in detail below with reference to the drawings.

It should be understood that reference to "a plurality of" in the present application refers to two or more. In the description of the present application, unless otherwise stated, "/" means "or." For example, A/B can mean A or B. In the present application, "and/or" is only an association relationship describing associated objects, indicating that there are three relationships. For example, A and/or B, which can mean that there are three situations as follows: A alone, A and B at the same time, and B alone. In addition, to clearly describe the technical solution of the present application, items "first" and "second" are used to distinguish the same item or similar items with substantially the same functions and roles. The person skilled in the art can understand that the items "first," "second" and the like do not limit the number or an execution order. The items "first," "second" and the like do not limit any difference.

Figure 1:
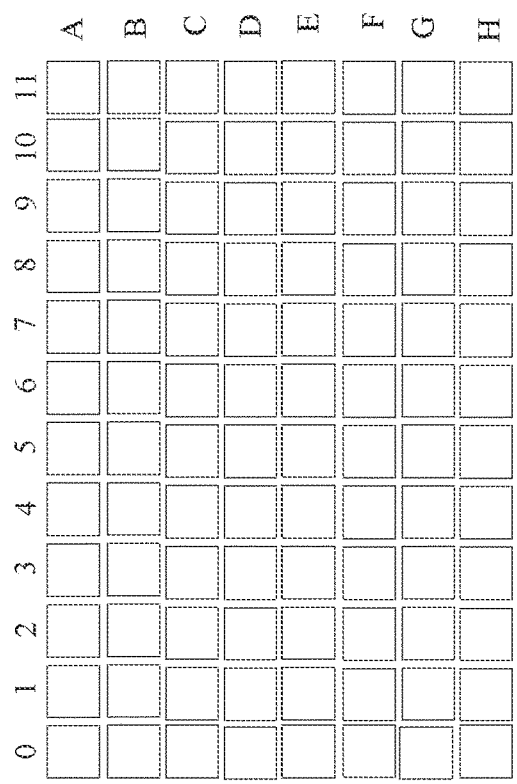
FIG. 1 is a schematic diagram of a laser emitting array and a laser receiving array according to an exemplary embodiment.
Figure 1:
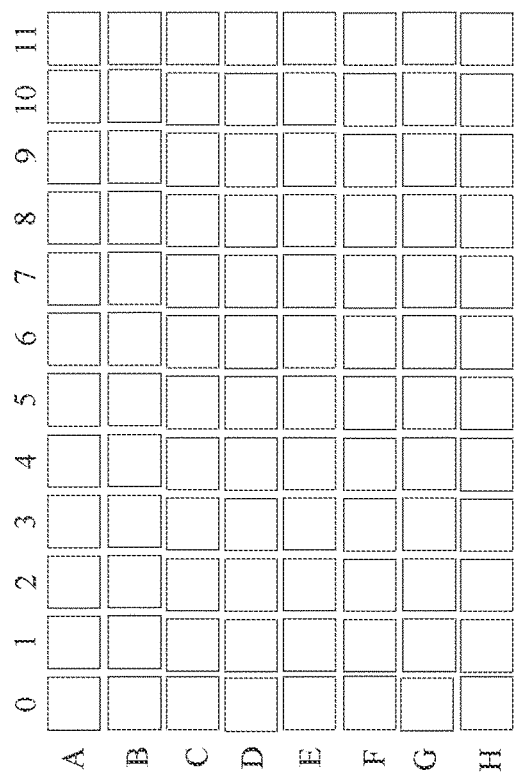

First, an execution body related to the embodiment of the present application is introduced. A method provided in the embodiment of the present application can be performed by an electronic apparatus. The electronic apparatus can be arranged or connected to an array LiDAR. That is, the LiDAR includes a laser emitting array and a laser receiving array. FIG. 1 is a schematic diagram of an array according to an exemplary embodiment. FIG. 1 (*a*) is a schematic diagram of the laser emitting array. FIG. 1 (*b*) is a schematic diagram of the laser receiving array.

In one example, the electronic apparatus can be a terminal apparatus such as a mobile phone, a notebook computer, a tablet computer, a mobile phone, or the like, or can be a car machine device. This is not limited in the embodiment of the present application.

Figure 2:
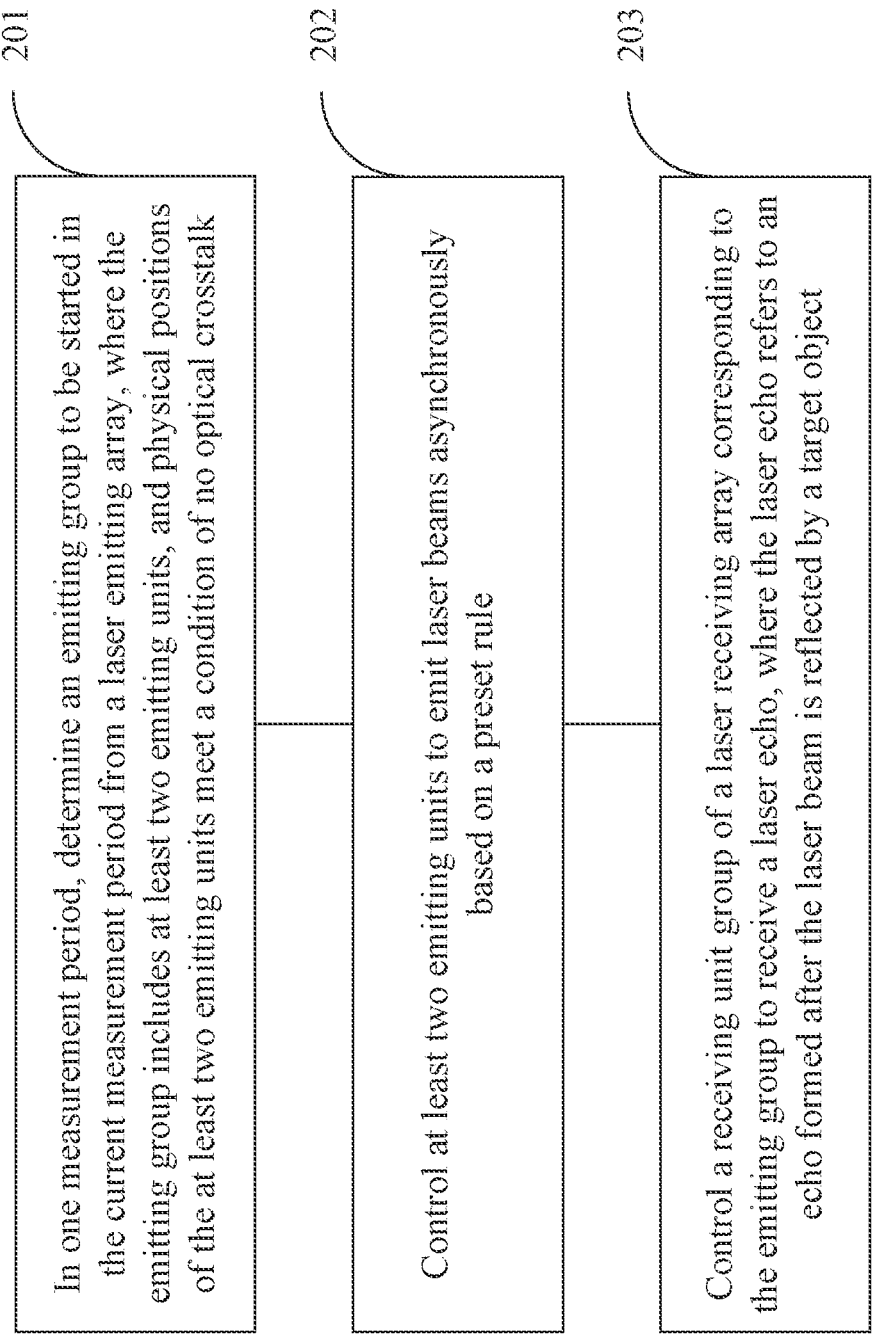
FIG. 2 is a flowchart of a LiDAR controlling method according to an exemplary embodiment.

Based on the electronic apparatus provided above, the method provided in the embodiment of the present application is described in detail below. FIG. 2 is a flowchart of a LiDAR controlling method according to an exemplary embodiment. The method can include the following steps.

Step 201: in a measurement period, from a laser emitting array, determine an emitting group to be started in the measurement period, wherein the emitting group includes at least two emitting units, and physical positions of the at least two emitting units meet a condition of no optical crosstalk.

The measurement period can be set according to actual needs.

The "condition of no optical crosstalk" means that there is almost no interference between a plurality of laser beams, that is, almost no overlap or no overlap. That is, an overlap rate is almost close to zero, or there is no overlap of laser beams.

In some embodiments, the electronic apparatus controls the emitting units in the laser emitting array of the LiDAR to periodically emit laser beams. As an example of the present application, the emission of the emitting units can be controlled by emitting groups in each of the measurement periods. For this purpose, it is necessary to determine which emitting unit or units are to be started. That is, in the current measurement period, the electronic apparatus determines the emitting group to be started from the laser emitting array in the measurement period.

As an example of the present application, the emission of different emitting groups can be controlled in different measurement periods from a first laser emitting line. For example, referring to FIG. 1, firstly, the different emitting groups in the first laser emitting line are controlled to emit laser beams in different measurement periods. After the emission of the first laser emitting line is finished, different emitting groups in a second laser emitting line are controlled to emit laser beams in different measurement periods, and so on, until a last laser emitting line is finished. Thereafter, it may return and continue to control different emitting groups in the first laser emitting line to emit laser beams in different measurement periods, and so on to repeat the control.

In this way, the emitting group to be started in each of the measurement periods can be determined according to a sequential control sequence of the lines. The number of the emitting units included in the emitting group can be set according to actual needs.

In one example, the emitting group includes two emitting units. For example, the two emitting units include a first emitting unit and a second emitting unit. That is, the two emitting units to be started are determined in one measurement period. For example, referring to FIG. 1, the determined emitting group includes an emitting unit A0 and an emitting unit A6 in a first measurement period. In a second measurement period, the determined emitting group includes an emitting unit A1 and an emitting unit A7. In a third measurement period, the determined emitting group includes an emitting unit A2 and an emitting unit A8. In a fourth measurement period, the determined emitting group includes an emitting unit A3 and an emitting unit A9. In a fifth measurement period, the determined emitting group includes an emitting unit A4 and an emitting unit A10. As shown in Table 1, in a sixth measurement period, the determined emitting group includes an emitting unit A5 and an emitting unit A11, and so on.

TABLE 1

Example of emitting twice in one measurement period

| Measurement period | First emitting unit | Second emitting unit |
|---|---|---|
| 1 | A0 | A6 |
| 2 | A1 | A7 |
| 3 | A2 | A8 |
| 4 | A3 | A9 |
| 5 | A4 | A10 |
| 6 | A5 | A11 |
| . . . | . . . | . . . |

It should be noted that, in the above description, one emitting group including two emitting units is used as an example. In another embodiment, one emitting group can also include three or more emitting units. This is not limited in the embodiment of the present application.

It should also be noted that a physical positional relationship of the at least two emitting units is determined according to power, an angle of view, and a detection distance of each of the at least two emitting units.

Figure 3:
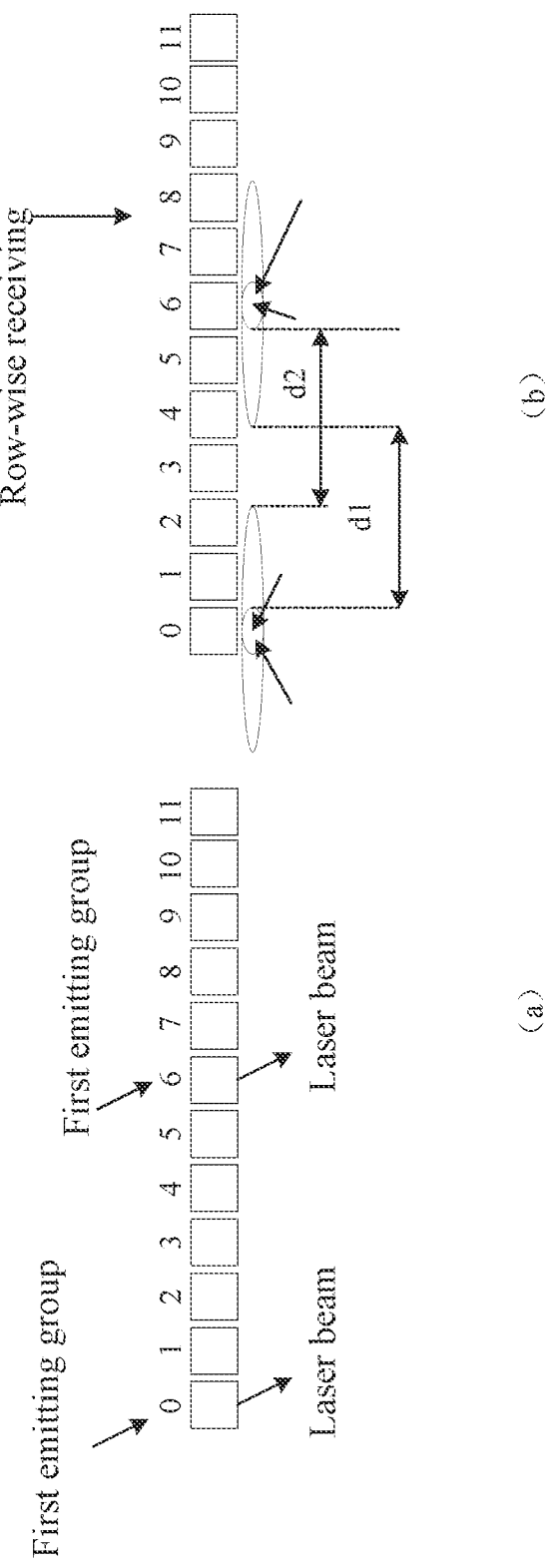
FIG. 3 is a schematic diagram of a laser emitting array and a laser receiving array according to another exemplary embodiment.

Because the laser beams of adjacent or close emitting units have crosstalk with each other, if the number of concurrent units needs to be increased, it is necessary to prevent optical crosstalk between multiple concurrent emitting units. For example, there are two emitting units in the emitting group, and in order to improve the ability to resist optical crosstalk, each of the emitting groups can be set to include a spatial position spacing for the emitting units according to an emission schematic diagram as shown in FIG. 3. The principle is, echo floodlight of one laser beam does not fall into a position of the other receiving unit. That is, both d1 and d2 are required to be greater than 0, and the width of the main energy of the echo is equal to that of the receiving unit. For example, there is no optical crosstalk between the emitting unit A0 and the emitting unit A6.

The number of the receiving units of the echo floodlight corresponding to the emitting unit is related to the power, the angle of view, and the detection distance of the emitting unit. If the intensity of a laser beam of the emitting unit is relatively large, the number of the receiving units corresponding to the echo floodlight is relatively large. If an emitting angle of view of the emitting unit is relatively small, the number of the receiving units corresponding to the echo floodlight is relatively large. If the detection distance corresponding to the emitting unit is close, the number of the receiving units corresponding to the echo floodlight is relatively large.

Step 202: control the at least two emitting units to emit laser beams asynchronously based on a preset rule.

The preset rule can be set according to actual needs.

As an example of the present application, step 202 can include: according to a time coding sequence corresponding to an emitting unit for a $k^{th}$ emission of the at least two emitting units, controlling the emitting unit for the $k^{th}$ emission to emit a laser beam at a corresponding time, wherein K is an integer greater than or equal to 1. After a first preset duration threshold expires, according to a time coding sequence corresponding to an emitting unit for a $(K+1)^{th}$ emission, controlling the emitting unit for the $(K+1)^{th}$ emission to emit a laser beam at the a corresponding time.

The first preset duration threshold can be set by a user according to actual needs, or can be set by the electronic apparatus by default. This is not limited in the embodiment of the present application.

That is, for two emitting units that emit adjacently in the emitting group, there is an emitting time interval of the first preset duration threshold between the two emission units. Exemplarily, assuming the emitting group includes three emitting units, the electronic apparatus controls the first emitting unit to emit a laser beam at the corresponding time according to a time coding sequence corresponding to the first emitting unit. After the first preset duration threshold expires, the electronic apparatus controls the second emitting unit to emit a laser beam at the corresponding time according to a time coding sequence corresponding to the second emitting unit. After the first preset duration threshold expires, the electronic apparatus controls a third emitting unit to emit a laser beam at the corresponding time according to a time coding sequence corresponding to the third emitting unit.

The time coding sequence corresponding to each of the emitting units in the laser emitting array can be predetermined. As an example of the present application, a method for determining the time coding sequence corresponding to any one of the emitting units in the emitting group includes:

generating a series of pseudo-random sequences via a linear feedback shift register based on a first preset sequence to obtain the plurality of pseudo-random sequences. An autocorrelation function of each of the plurality of pseudo-random sequences is determined. According to the autocorrelation function, a pseudo-random sequence whose autocorrelation coefficient is less than a first specified threshold is screened from the plurality of pseudo-random sequences. The pseudo-random sequence is selected from the at least one screened pseudo-random sequence as the time coding sequence corresponding to any one of the emitting units.

The first preset sequence can be set according to actual needs, which can be understood as a sequence seed for generating a series of pseudo-random sequences. In one example, the different emitting units correspond to the different first preset sequences.

The first specified threshold can be set according to actual needs.

In an implementation, the first preset sequence can be input into the linear feedback shift register. A series of pseudo-random sequences can be output from the linear feedback shift register to obtain the plurality of pseudo-random sequences. For any one of the plurality of pseudo-random sequences, if the pseudo-random sequence has a relatively large correlation with itself, when the pseudo-random sequence is subsequently selected as the time coding sequence of the emitting unit, the laser beam emitted by the emitting unit is likely to interfere with the laser beam emitted by itself at the next time. Therefore, the autocorrelation function of each of the plurality of pseudo-random sequences can be determined, so as to screen out the pseudo-random sequence with less interference to itself according to the autocorrelation function. In practice, the autocorrelation function of each of the pseudo-random sequences can be determined by the following equation (1):

$$ACF(a, \tau) = \sum_{i=1}^{p} a_i a_{i+\tau} \qquad (1)$$

Where $ACF(\alpha,\tau)$ is an autocorrelation function, $a_i$ represents the $i^{th}$ pseudo-random sequence, and $\tau$ is a preset time offset.

Then, the pseudo-random sequence that satisfies the autocorrelation function as small as possible outside a main lobe is selected (for example, less than an energy threshold). The selected pseudo-random sequence is the pseudo-random sequence whose autocorrelation coefficient is less than the first specified threshold. In one example, the electronic apparatus randomly selects a pseudo-random sequence from the at least one screened pseudo-random sequence as a time coding sequence corresponding to the emitting unit in the emitting group. For example, after the above processing, it is determined that the time coding sequence of the emitting unit is {0.1, 0.4, 0.2, 0.25, . . . }. In this manner, the time coding sequence corresponding to each of the emitting units in the laser emitting array can be determined.

In one example, the number of values included in the time coding sequence is the same as the number of cyclic emissions. Exemplarily, if a specific emitting unit needs to cyclically perform 64 emissions, the value in the time coding sequence is 64.

It should be noted that emitting time of each of the emitting units in different measurement periods is coded by the pseudo-random sequence. The different emitting units adopt different codes, which can achieve low crosstalk and reduce mutual interference under a condition of a high concurrency number.

After being determined, the time coding sequence corresponding to each of the emitting units can be stored locally. When emission of the emitting unit needs to be controlled, the time coding sequence corresponding to each of the emitting units can be used according to actual needs.

Figure 4:
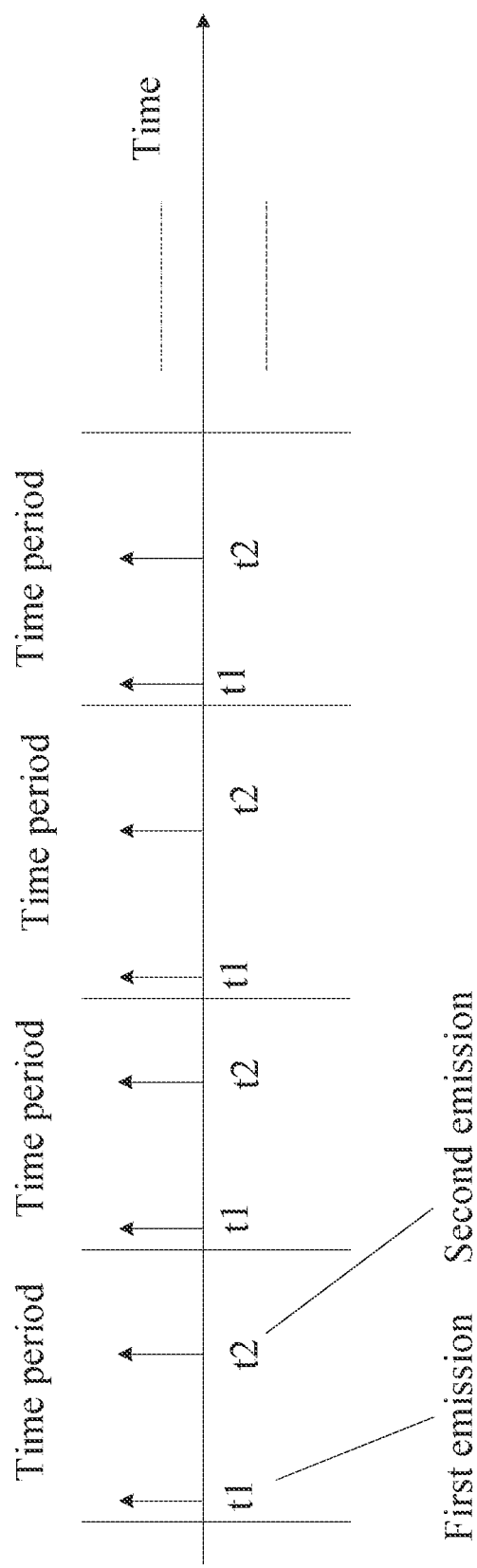
FIG. 4 is a schematic diagram of an emitting rule of a laser beam according to an exemplary embodiment.

Exemplarily, referring to FIG. 4, in the first measurement period, emission of the emitting unit A0 in the emitting group is controlled for the first time at time t1. Emission of the emitting unit A6 in the emitting group is controlled for the second time at time t2. It is assumed that the time coding sequence of the emitting unit A0 is {0.2, 0.3, 0.4, 0.6 . . . }, and the time coding sequence of the emitting unit A1 is {0.3, 0.4, 0.6, 0.7 . . . }. The first preset duration threshold is 3 seconds. It is assumed that the start time of the current measurement period is the 2nd second. The emitting unit A0 is controlled to emit a laser beam at the $2.2^{nd}$ second. The emitting unit A1 is controlled to emit a laser beam at the $5.3^{rd}$ second. Similarly, in the second measurement period, the emission of the emitting unit A1 in the emitting group is controlled for the first time at t1 time in the second measurement period. The emission of A7 is controlled for the second time at t2 time, and so on.

In some embodiments, sequential emission sequences of the plurality of emitting units within the emitting group can also be interchangeable in one measurement period.

Step 203: control a receiving unit group of the laser receiving array corresponding to the emitting group to receive laser echoes, wherein the laser echo refers to an echo formed after the laser beams are reflected by a target object.

Referring to FIG. 1, it is assumed that the first laser emitting line corresponds to a first laser receiving line. The second laser emitting line corresponds to a second laser receiving line, and so on. A last laser emitting line corresponds to a last laser receiving line. When any emitting unit in the first laser emitting line is controlled to emit a laser beam, the first laser receiving line receives the laser echo. Similarly, when any emitting unit in the second laser emitting line is controlled to emit a laser beam, the second laser receiving line receives the laser echo. By analogy, when any emitting unit in the last laser emitting line is controlled to emit a laser beam, the laser echo is received by the last laser receiving line.

Exemplarily, if time-sharing emission by the emitting unit A0 and the emitting unit A6 is controlled in the current measurement period, the laser echoes are all received by the first laser receiving line. That is, the laser beam emitted by the emitting unit A0 is received by the first laser receiving line, and the laser beam emitted by the emitting unit A6 is also received by the first laser receiving line.

In the laser receiving array, all the laser echoes in the whole measurement period are extracted. When time is less than t2, the laser echo is a laser echo corresponding to the first emitting unit. When the time is greater than t2, the laser echoes are all the laser echoes corresponding to the second emitting group. Further, when time coding t1 corresponding to the first emitting unit is zero, emitting time of the first emitting unit is exactly aligned with the start time of the current measurement period. When a value of t1 is greater than 0, a distance of t1*C is subtracted when a distance of the laser echo corresponding to the first emitting unit is calculated, where C represents a speed of the laser beam. When the value of t1 is a negative value, the distance of t1*C is added when the distance of the laser echo corresponding to the first emitting unit is calculated. There is usually a relatively large delay t2 between the emitting time of the second emitting unit and the start time of the measurement period. t2 is the first preset duration threshold. A value of time difference between t2 and t1 generally satisfies the condition of t2−t1>=Lset*2/c, where Lset is the farthest detection distance of the LiDAR. Similarly, when a distance of a laser echo corresponding to the second emitting unit is calculated, a distance of t2*c is subtracted.

It should be noted that the above description takes as an example one laser emitting line corresponding to one laser receiving line. In another embodiment, the plurality of laser emitting lines can correspond to one laser receiving line, or one laser emitting lines can correspond to the plurality of laser receiving lines. This is not limited in the embodiment of the present application.

In addition, in one measurement period, the laser receiving line continuously executes a receiving operation. That is, from the start time of one measurement period to the end time of the measurement period, the electronic apparatus controls the laser receiving line corresponding to the laser emitting line where the emitting group is located, to continuously receive the laser echo.

In an embodiment of the present application, within one measurement period, the emitting group to be started in the current measurement period is determined from the laser emitting array. The emitting group includes the at least two emitting units. The physical positions of the at least two emitting units meet the condition of no optical crosstalk. The at least two emitting units are controlled to emit the laser beam asynchronously based on the preset rule. The receiving unit group of the laser receiving array corresponding to the emitting group is controlled to receive the laser echo. The laser echo refers to the echo formed after the laser beam is reflected by the target object. In this way, in the measurement period, by controlling the plurality of emitting units to emit laser beams at different times, while ensuring a scanning frame rate, it also avoids the optical crosstalk caused by the plurality of emitting units emitting laser beams at the same time. That is, in the method provided in the present application, the problems of both optical crosstalk and frame rate of an array LiDAR can be solved, so that measurement results can be accurately determined.

Figure 5:
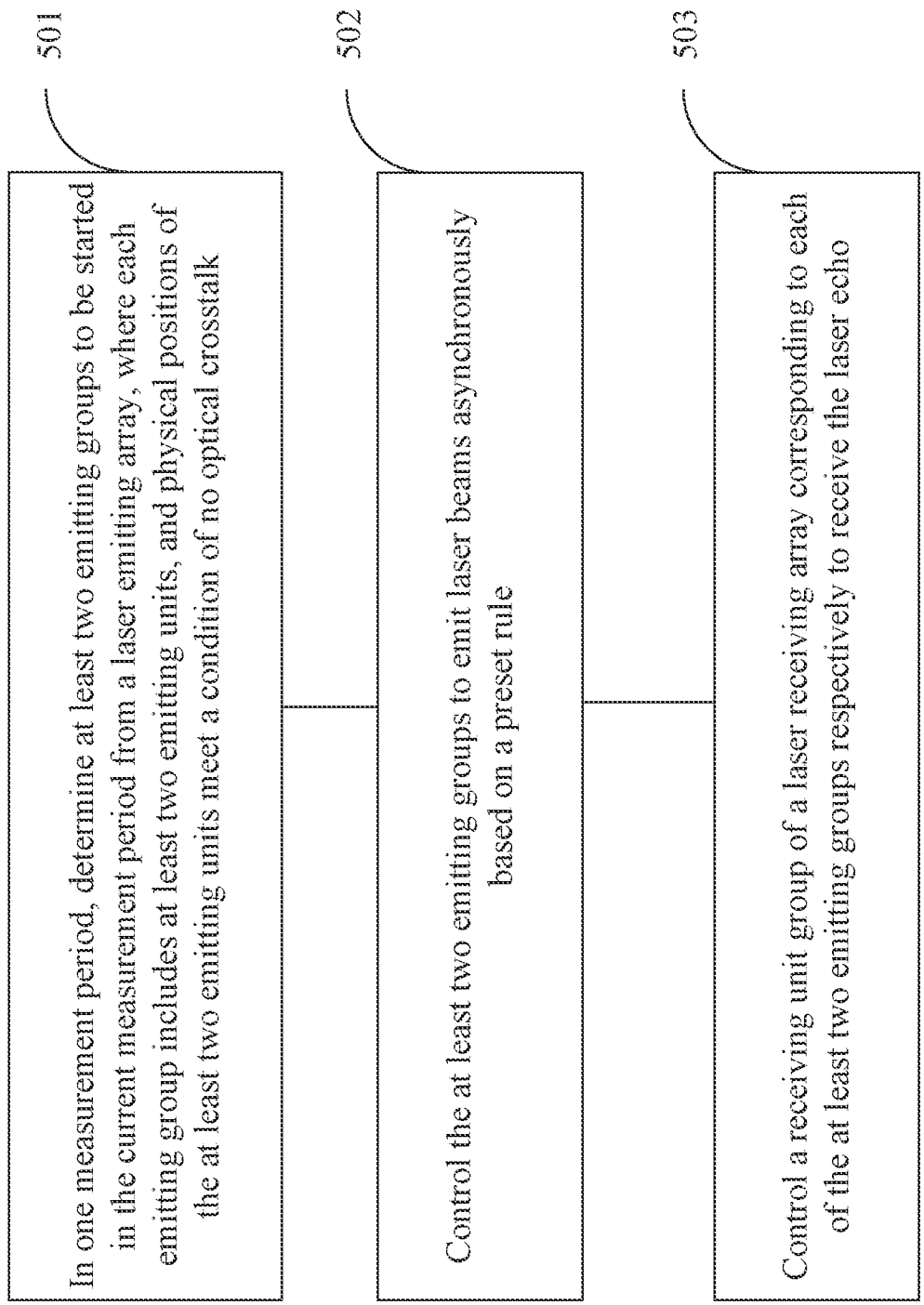
FIG. 5 is a flowchart of a LiDAR controlling method according to another exemplary embodiment.

The above embodiment is described by taking as an example one emitting group presented in one measurement period. In another embodiment, there are at least two emitting groups in one measurement period. In this case, refer to FIG. 5, which is a flowchart diagram of a LiDAR controlling method according to another exemplary embodiment. The method can include the following steps.

Step 501: in one measurement period, determine at least two emitting groups to be started in the current measurement period from the laser emitting array, wherein each emitting group includes at least two emitting units, and physical positions of the at least two emitting units meet a condition of no optical crosstalk.

As an example of the present application, an electronic apparatus can determine a plurality of emitting groups to be started in each of the measurement periods based on a preset rule. For example, the plurality of emitting groups to be started in each of the measurement periods can be determined according to a sequential control order of lines in the laser emitting array.

As an example of the present application, all the emitting units in one partition region of the laser emitting array (for example, a line of emitting units is one partition region) can be controlled to emit laser beams asynchronously in the measurement period. In some embodiments, a part of the emitting units in one partition region of the laser emitting array can be controlled to emit laser beams asynchronously in one measurement period. Duration of one measurement period and the number of the emitting groups included in one measurement period can be set according to actual needs.

Exemplarily, there are two emitting groups in each of the measurement periods, and include, for example, a first emitting group and a second emitting group. The first emitting group includes two emitting units. The second emitting group includes two emitting units. That is, the two emitting groups to be started are determined in one measurement period. There are two emitting units to be started in each of the emitting groups.

Figure 6:
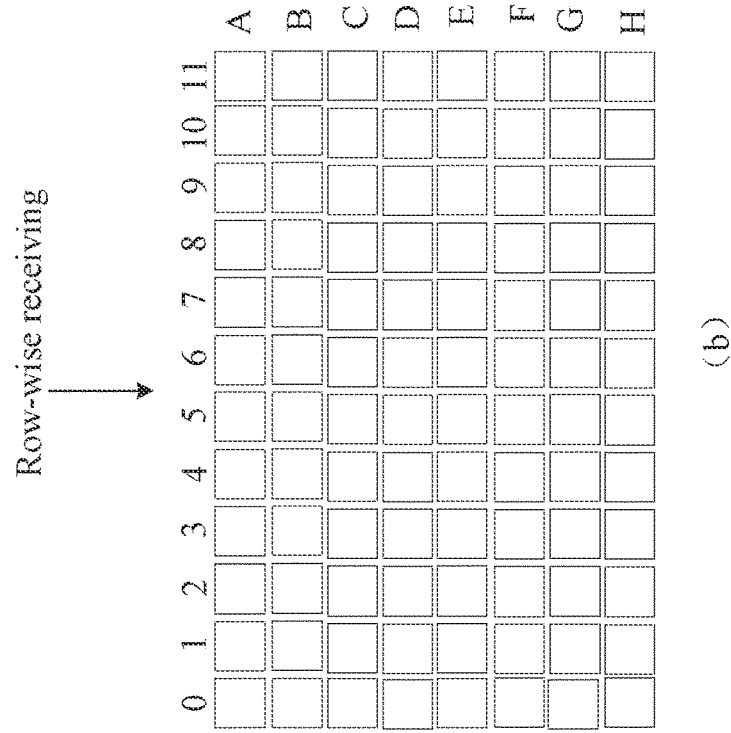
FIG. 6 is a schematic diagram of a laser emitting array and a laser receiving array according to another exemplary embodiment.
Figure 6:
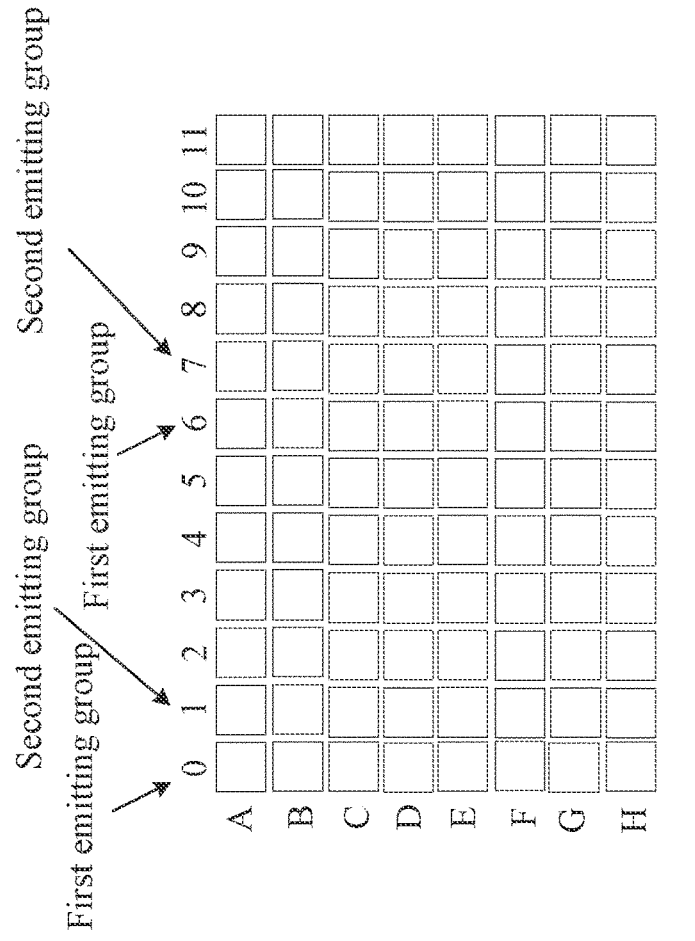

For example, referring to FIG. 6, in a first measurement period, the first emitting group includes an emitting unit A0 and an emitting unit A6. The second emitting group includes an emitting unit A1 and an emitting unit A7. In a second measurement period, it is determined that the first emitting group includes an emitting unit A2 and an emitting unit A8. The second emitting group includes an emitting unit A3 and an emitting unit A9. In a third measurement period, it is determined that the first emitting group includes an emitting unit A4 and an emitting unit A10. The second emitting group includes an emitting unit A5 and an emitting unit A11, and so on, as shown in Table 2.

TABLE 2

Example of emitting 4 times in one measurement period

| Measurement period | First emitting group | Second emitting group |
| --- | --- | --- |
| 1 | A0, A6 | A1, A7 |
| 2 | A2, A8 | A3, A9 |
| 3 | A4, A10 | A5, A11 |

It should be noted that the above description takes as an example that there are two emitting groups in each of the measurement periods. That is, a part of the emitting units of one partition region is determined as the emitting unit to be started in one measurement period. In another embodiment, the number of the emitting groups in each of the measurement periods can also be other values. For example, there can also be six emitting groups in each of the measurement periods, and are (A0, A6), (A1, A7), (A2, A8), (A3, A9), (A4, A10), (A5, A11), respectively. That is, all the emitting units in one partition region can be determined as the emitting units to be started in the measurement period.

Figure 7:
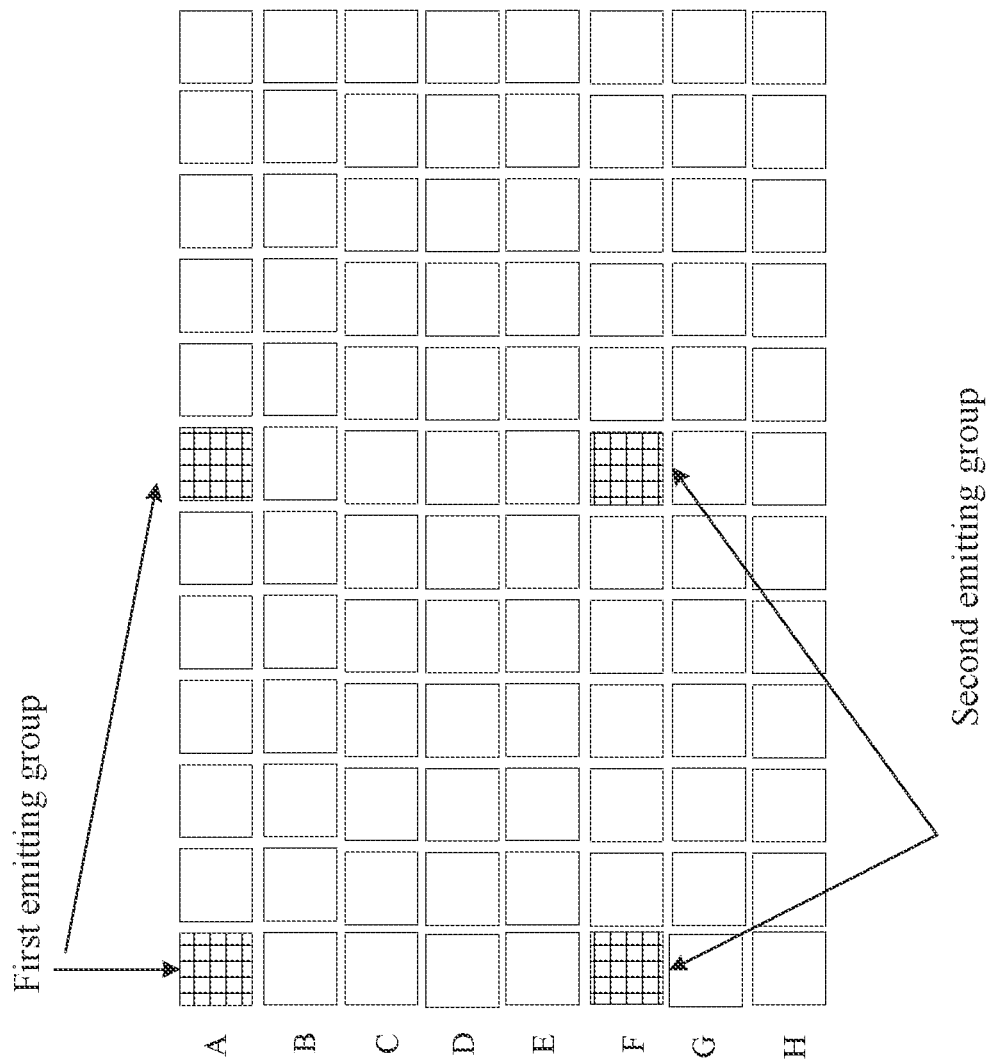
FIG. 7 is a schematic diagram of a laser emitting array according to another exemplary embodiment.

In addition, it should be noted that the above is explained by taking line-by-line control as an example. In another embodiment, the control can also be performed according to other control modes such as interlacing control. As an example, referring to FIG. 7, the physical positions of the at least two emitting units meet the condition of no optical crosstalk. At this time, the first emitting group includes the emitting unit A0 and the emitting unit A6. The second emitting group includes an emitting unit F0 and an emitting unit F6 in the measurement period.

Step 502: Control the at least two emitting groups to emit laser beams asynchronously based on the preset rule.

As an example of the present application, the emitting unit in each of the emitting groups can be controlled to emit a laser beam in a serial control manner. In practice, each of the at least two emitting groups is sequentially controlled to emit the laser beam according to a preset emitting timing sequence. Emitting time of the first emitting unit of each of the at least two emitting groups has an emitting time interval of a second preset duration threshold in the same measurement period.

The preset emitting timing sequence can be set according to actual needs. For example, it is assumed that the at least two emitting groups include the first emitting group, the second emitting group, and a third emitting group. Emission of the first emitting group can be controlled first, then emission of the second emitting group can be controlled, and finally emission of the third emitting group can be controlled. In addition, there is a certain emitting time interval between two adjacent emitting groups. That is, there is an emitting time interval of the second preset duration threshold between the first emitting unit in the first emitting group and the first emitting unit in the second emitting group, and there is the emitting time interval of the second preset duration threshold between the first emitting unit in the second emitting group and the first emitting unit in the third emitting group.

The second preset duration threshold can be set according to actual needs. In one example, a time difference between the second preset duration thresholds t3 and t4 meets the condition that t3−t4>=Lset*2/C, where t4 is time coding corresponding to the first emitting unit in the adjacent emitting groups. Lset is the farthest detection distance of the LiDAR. C represents a speed of the laser beam. In one example, the second preset duration threshold is greater than the first preset duration threshold. A difference between the second preset duration threshold and the first preset duration threshold is greater than a preset value.

In one embodiment, the at least two emitting groups include the first emitting group and the second emitting group. The first emitting group includes the first emitting unit and a second emitting unit. The second emitting group includes a third emitting unit and a fourth emitting unit. In this case, specific implementation of controlling the at least two emitting groups to emit laser beams asynchronously based on the preset rule can include: according to a time coding sequence corresponding to the first emitting unit, controlling the first emitting unit to emit a laser beam at a corresponding time; after the first preset duration threshold expires, controlling the second emitting unit to emit a laser beam at the corresponding time according to a time coding sequence corresponding to the second emitting unit. After the first emitting unit is controlled to emit the laser beam, and a second preset duration threshold expires, according to a time coding sequence corresponding to the third emitting unit, the third emitting unit is controlled to emit a laser beam at the corresponding time. After the first preset duration threshold expires, the fourth emitting unit is controlled to emit a laser beam at the corresponding time according to a time coding sequence corresponding to the fourth emitting unit.

For example, referring to FIG. 6, in the first measurement period, the four emitting units A0, A6, A1, and A7 are controlled to emit laser beams altogether. The emitting unit A0 and the emitting unit A6 are controlled to emit laser beams first, and then the emitting unit A1 and the emitting unit A7 are controlled to emit laser beams after the second preset duration threshold expires. It is assumed that a time coding sequence corresponding to the emitting unit A0 is {0.2, 0.3, 0.4, 0.6 . . . }. A time coding sequence corresponding to the emitting unit A6 is {0.3, 0.4, 0.6, 0.7 . . . }. A time coding sequence corresponding to the emitting unit A1 is {0.2, 0.3, 0.5, 0.7 . . . }. A time coding sequence corresponding to the emitting unit A7 is {0.32, 0.41, 0.53, 0.7 . . . }. The first preset duration threshold is 3 seconds, and a second preset duration is 5 seconds. If a start time of the current measurement period is the $2^{nd}$ second, the emitting unit A0 is controlled to emit a laser beam at the $2.2^{nd}$ second. The emitting unit A6 is controlled to emit a laser beam at the $5.3^{rd}$ second. The emitting unit A1 is controlled to emit a laser beam at the $7.2^{nd}$ second. The emitting unit A7 is controlled to emit a laser beam at the $10.32^{nd}$ second.

It should be noted that, in the above example, the emitting time of the first emitting unit in each of the emitting groups within the same measurement period has an emission time interval of the second preset duration threshold. In another embodiment, the emitting time interval of the first emitting unit in each of the emitting groups within the same measurement period can be determined by means of time coding. The time coding rules are described below.

As another example of the present application, the electronic apparatus can also control parallel emission of the two emitting groups when physical positions of the at least two emitting units meet the condition of no optical crosstalk. In practice, each of the at least two emitting groups are controlled to emit laser beams in parallel. The emitting units in the same emitting order in the at least two emitting groups emit laser beams based on time coding sequences corresponding to the emitting units in the same emitting order. A cross-correlation coefficient between the time coding sequences corresponding to the emitting units with the same emitting order in adjacent emitting groups is less than a second specified threshold.

The second specified threshold can be set according to actual needs. This is not limited in the embodiment of the present application.

For example, referring to FIG. 6, in the first measurement period, the four emitting units A0, A6, F0, and F6 are controlled to emit laser beams altogether. The emitting units A0 and A6 belong to the first emitting group, and the emitting units F0 and F6 belong to the second emitting group. The electronic apparatus controls the parallel emission of the first emitting group and the second emitting group. It is assumed that the time coding sequence corresponding to the emitting unit A0 is {0.2, 0.3, 0.4, 0.6 . . . }. The time coding sequence corresponding to the emitting unit A6 is {0.3, 0.4, 0.6, 0.7 . . . }. A time coding sequence corresponding to the emitting unit F0 is {0.4, 0.3, 0.1, 0.5 . . . }. A time coding sequence corresponding to the emitting unit F6 is {0.32, 0.4, 0.5, 0.7 . . . }. The first preset duration threshold is 3 seconds. If the start time of the current measurement period is the $2^{nd}$ second, the emitting unit A0 is controlled to emit the laser beam at the $2.2^{nd}$ second. The emitting unit A6 is controlled to emit the laser beam at the $5.3^{rd}$ second. The emitting unit F0 is controlled to emit a laser beam at the 2.4th second. The emitting unit F6 is controlled to emit a laser beam at the $5.32^{nd}$ second.

In some embodiments, sequential emission sequences in the plurality of emitting groups can also be interchangeable in one measurement period. Exemplarily, in the above example, each of the emitting units in the second emitting group can be controlled to emit the laser beam first, and then each of the emitting units in the first emitting group can be controlled to emit the laser beam.

The time coding sequence corresponding to each of the emitting units can be determined in advance. Taking as an example that there are two emitting groups in each of the measurement periods, for the two emitting units of the first emitting group and the second emitting group having the same emitting order (e.g. A0 for the first emission in the first emitting group and A1 for the first emission in the second emitting group in serial control, or A0 for the first emission in the first emitting group and F0 for the first emission in the second emitting group in parallel control), a method for determining the time coding sequence corresponding to each of the emitting units in the two emitting units includes: based on a second preset sequence, generating a series of pseudo-random sequences via a linear feedback shift register to obtain m pseudo-random sequences, where m is an integer greater than 1. An autocorrelation function of each of the m pseudo-random sequences is determined. Based on the autocorrelation function of each of the m pseudo-random sequences, s pseudo-random sequences whose autocorrelation coefficients are less than a third specified threshold are screened from the m pseudo-random sequences, where s is an integer greater than 1 or less than or equal to m. Based on the s pseudo-random sequences, the time coding sequence corresponding to each of the two emitting units is determined.

The third specified threshold can be set according to actual needs. In one example, the third specified threshold can be the same as the first specified threshold. In another example, the third specified threshold and the first specified threshold can also be different.

The second preset sequence can be set according to actual needs. The second preset sequence can also be understood as one sequence seed for generating a series of pseudo-random sequences.

In an implementation, the second preset sequence is input to the linear feedback shift register. A series of pseudo-random sequences are generated by the linear feedback shift register. Similarly, for any pseudo-random sequence in the series of the generated pseudo-random sequences, if the pseudo-random sequence has a relatively large correlation with itself, when the pseudo-random sequence is subsequently selected as the time coding sequence of the emitting unit, the laser beam emitted by the emitting unit is likely to interfere with the laser beam emitted by itself at the next time. The autocorrelation function of each of the m generated pseudo-random sequences can be determined, for example, by equation (1). Thereafter, the pseudo-random sequence, which satisfies that outside the main lobe of the autocorrelation function is as small as possible, is selected. For example, the pseudo-random sequence whose autocorrelation coefficient is less than the third specified threshold is selected.

Then, based on the s screened pseudo-random sequences, the time coding sequence corresponding to each of the two emitting units is determined. As an example of the present application, specific implementations thereof can include: determining a cross-correlation function between each of the s pseudo-random sequences and other respective pseudo-random sequences of the s pseudo-random sequences. According to the determined cross-correlation function, the two pseudo-random sequences whose cross-correlation coefficients are less than the second specified threshold are screened from the s pseudo-random sequences. The two screened pseudo-random sequences are determined as the time coding sequence corresponding to each of the two emitting units, respectively.

Since a measurement period includes a plurality of emitting groups, if the plurality of emitting groups emit in parallel, that is, if the plurality of emitting groups adopt the same pseudo-random sequence as the time coding sequence, optical crosstalk is likely to occur between the plurality of emitting groups. To this end, in one example, the electronic apparatus determines the cross-correlation function between each of the s screened pseudo-random sequences and other respective pseudo-random sequences of the s pseudo-random sequences, so as to screen a pseudo-random sequence that does not generate the optical crosstalk from the s pseudo-random sequences according to the determined cross-correlation function. In practice, the cross-correlation function between the two pseudo-random sequences can be determined by the following equation (2):

$$CCF(a, b, \tau) = \sum_{i=1}^{p} a_i b_{i+\tau} \quad (2)$$

Where $CCF(a,b,\tau)$ is a cross-correlation function, $a_i$ is one pseudo-random sequence, and $b_{i+\tau}$ is another pseudo-random sequence.

Thereafter, a pair of the pseudo-random sequences satisfying a condition that the cross-correlation coefficient is less than a preset second specified threshold is selected. For example, a pair of pseudo-random sequences with the smallest cross-correlation coefficient can be selected as a random sequence. A pair of the selected pseudo-random sequences is determined as the time coding sequences corresponding to each of the two emitting units, respectively. In this manner, the time coding sequence corresponding to each of the emitting units in the laser emitting array can be determined.

In another embodiment, if three or more emitting groups are included in the measurement period, when the time coding sequence corresponding to each of the emitting units in each of the emitting groups is determined, the time coding sequence corresponding to each of the emitting units in the first emitting group and the second emitting group can be determined in the above manner. Then, based on the time coding sequence corresponding to each of the emitting units of the second emitting group, according to the above method, a time coding sequence corresponding to each emitting unit in the third emitting group adjacent to the second emitting group continues to be determined. For example, for the remaining s-2 pseudo-random sequences, the pseudo-random sequence having the smallest cross-correlation coefficient with the time coding sequence corresponding to the first emitting unit in the second emitting group can be selected. The selected pseudo-random sequence can be taken as the time coding sequence corresponding to the first emitting unit in the third emitting group. By analogy, it is possible to determine the time coding sequence corresponding to each of the emitting units included in each of the plurality of emitting groups in this manner.

Step 503: control receiving unit groups of a laser receiving array corresponding to each of the at least two emitting groups respectively to receive laser echoes.

In one example, when the electronic apparatus controls serial emission of the plurality of emitting groups. For example, the four emitting units A0, A6, A1, and A7 are controlled to emit laser beams in the measurement period, the laser echoes can all be received by a first laser receiving line in this measurement period.

In one example, when the electronic apparatus controls parallel emission of the plurality of emitting groups. For example, the four emitting units A0, A6, F0, and F6 are controlled to emit the laser beams in the measurement period, the first laser receiving line can be controlled to receive laser echoes of the emitting units A0, A6, and a sixth laser receiving line can be controlled to receive laser echoes of the emitting units F0 and F6 in this measurement period.

In the embodiment of the present application, different emitting units in the plurality of emitting groups can be controlled to emit the laser beams asynchronously. There-fore, in addition to improving scanning frame rate, the optical crosstalk caused by the simultaneous emission of laser beams by the plurality of emitting units can be avoided, thereby improving the accuracy of measurement results.

It should be understood that a sequence number of each step in the above embodiment does not mean an execution order. The execution order of each process is determined by a function and an inherent logic thereof, which does not constitute any limitation on an implementation process of the embodiment of the present application.

Figure 8:
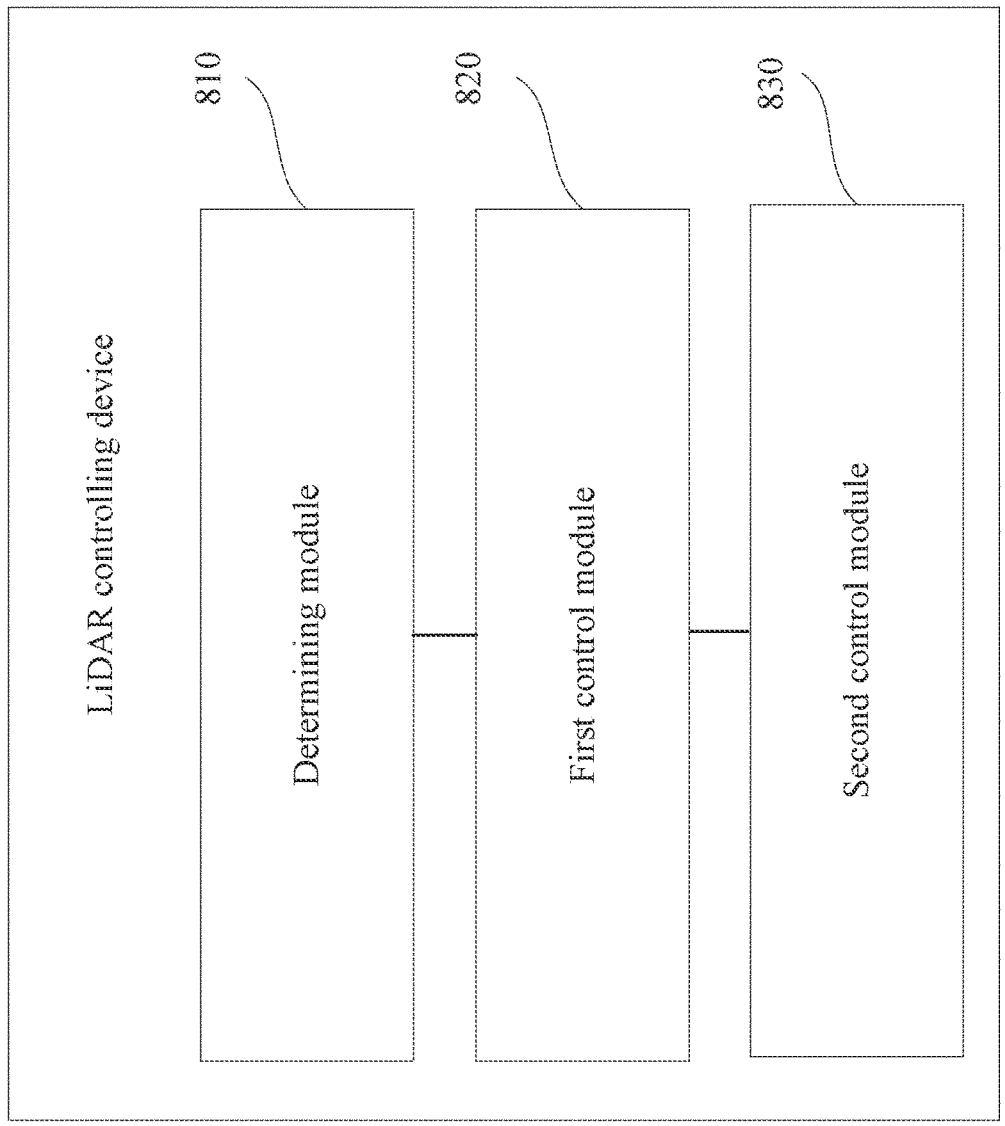
FIG. 8 is a schematic structural diagram of a LiDAR controlling device according to an exemplary embodiment.

FIG. 8 is a schematic structural diagram of a LiDAR controlling device according to an exemplary embodiment. The device can be implemented by software, hardware, or a combination of both. The device for controlling the LiDAR can include:

a determining module 810, configured to determine, in one measurement period, an emitting group to be started in the current measurement period from a laser emitting array, where an emitting group includes at least two emitting units, and physical positions of the at least two emitting units meet a condition of no optical crosstalk;

a first control module 820, configured to control the at least two emitting units to emit laser beams asynchronously based on a preset rule; and a second control module 830, configured to control a receiving unit group of the laser receiving array corresponding to the emitting group to receive a laser echo, where the laser echo refers to an echo formed after the laser beam is reflected by a target object.

As an example of the present application, the first control module 820 is configured to:

according to a time coding sequence corresponding to an emitting unit for a $k^{th}$ emission of the at least two emitting units, control the emitting unit for the $k^{th}$ emission to emit the laser beam at a corresponding time, wherein K is an integer greater than or equal to 1; and after a first preset duration threshold expires, according to a time coding sequence corresponding to an emitting unit for a $(K+1)^{th}$ emission of the at least two emitting units, control the emitting unit for the $(K+1)^{th}$ emission to emit a laser beam at a corresponding time.

As an example of the present application, the determining module 810 is further configured to:

based on a first preset sequence, generate a series of pseudo-random sequences via a linear feedback shift register to obtain the plurality of pseudo-random sequences;

determine an autocorrelation function of each of the plurality of pseudo-random sequences;

determine, according to the autocorrelation functions and from the plurality of pseudo-random sequences, at least one pseudo-random sequence whose autocorrelation coefficient is less than a first specified threshold; and select one pseudo-random sequence from the determined at least one pseudo-random sequence as the time coding sequence corresponding to any one of the emitting units.

As an example of the present application, when at least two emitting groups are determined in one measurement period, the first control module 820 is further configured to: control the at least two emitting groups to emit laser beams asynchronously based on a preset rule.

The second control module 830 is configured to:

control the receiving unit group of the laser receiving array corresponding to each of the at least two emitting groups respectively to receive the laser echo.

As an example of the present application, the first control module 820 is configured to:

sequentially control each of the at least two emitting groups to emit the laser beam according to a preset emitting timing sequence, wherein emission of first emitting unit of each of the at least two emitting groups in the same measurement period has an emitting time interval of a second preset duration threshold.

As an example of the present application, the physical positions of the at least two emitting units meet the condition of no optical crosstalk. The first control module 820 is configured to:

control each of the at least two emitting groups to emit laser beams in parallel, where the emitting units in the same emitting order in the at least two emitting groups emit laser beams based on time coding sequences corresponding to the emitting units in the same emitting order, and a cross-correlation coefficient between the time coding sequences corresponding to the emitting units in the same emitting order in adjacent emitting groups is less than a second specified threshold.

As an example of the present application, a physical positional relationship of the at least two emitting units is determined according to power, an angle of view, and a detection distance of each of the at least two emitting units.

In an embodiment of the present application, in one measurement period, the emitting group to be started in the current measurement period is determined from the laser emitting array. The emitting group includes the at least two emitting units. The physical positions of the at least two emitting units meet the condition of no optical crosstalk. The at least two emitting units are controlled to emit the laser beam asynchronously based on the preset rule. The receiving unit group of the laser receiving array corresponding to the emitting group is controlled to receive the laser echo. The laser echo refers to the echo formed after the laser beam is reflected by the target object. In this way, in the measurement period, by controlling the at least two emitting units to emit laser beams at different times, it not only avoids optical crosstalk, but also ensures a scanning frame rate. That is, in the method provided in the present application, the problems of both optical crosstalk and frame rate of an array LiDAR can be solved, so that measurement results can be accurately determined.

Figure 9:
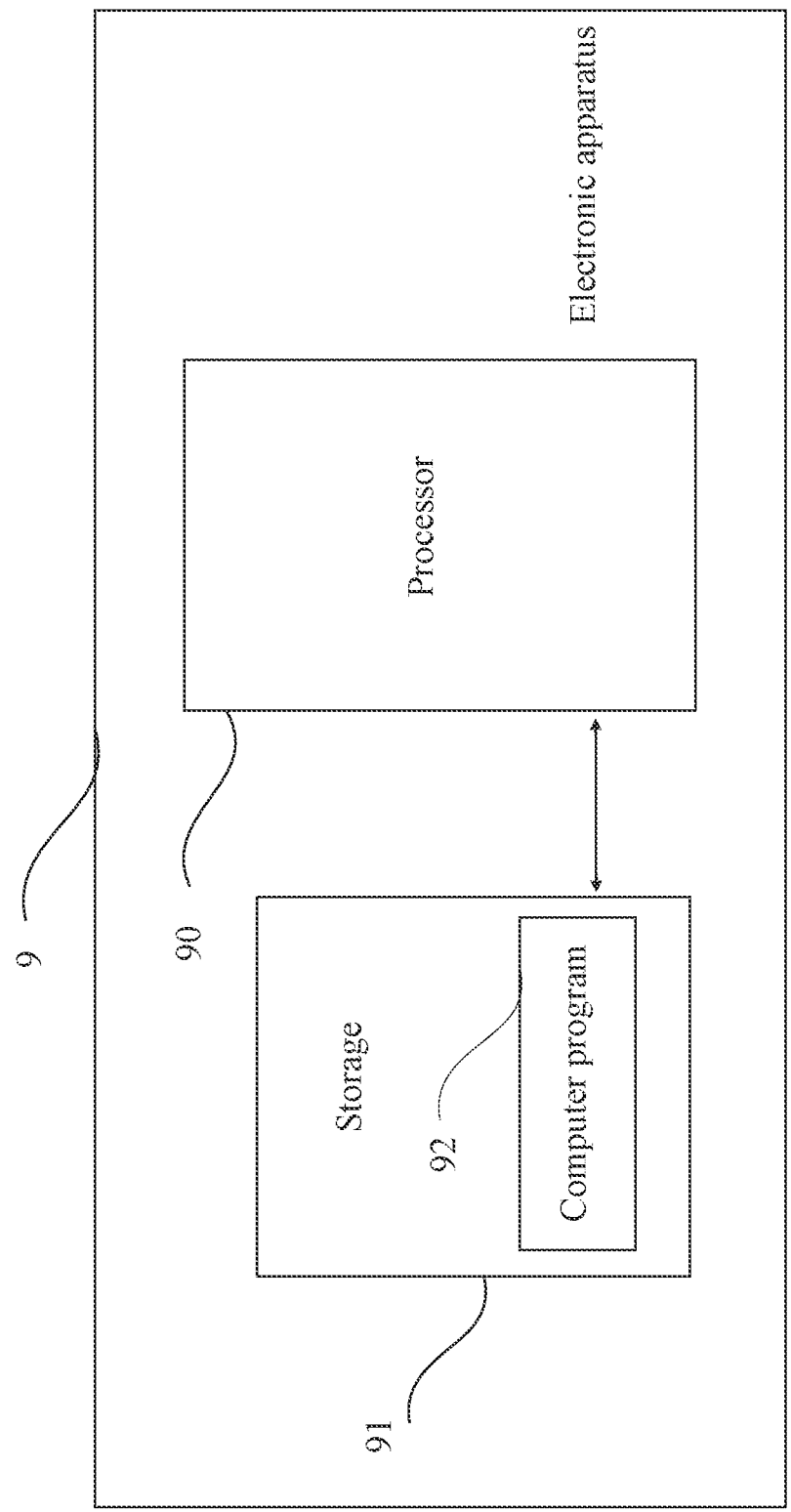
FIG. 9 is a schematic structural diagram of an electronic apparatus according to an exemplary embodiment.

FIG. 9 is a schematic structural diagram of an electronic apparatus provided in an embodiment of the present application. As shown in FIG. 9, the electronic apparatus 9 of the embodiment includes at least one processor 90 (only one is shown in FIG. 9), a storage 91, and computer program 92 stored in the storage 91 and executable on the at least one processor 90. The processor 90 implements the steps in any of the above method embodiments when executing the computer program 92.

The electronic apparatus 9 can be a computing device such as a desktop computer, a notebook computer, a palmtop computer, or a cloud server. The electronic apparatus can include, but is not limited to, a processor 90 and a storage 91. The person skilled in the art can understand that FIG. 9 is merely an example of the electronic apparatus 9 and does not constitute a limitation to the electronic apparatus 9. The electronic apparatus 9 can include more or fewer components than illustrated, or a combination of specific components, or different components, such as an input-output device, a network access device, etc.

The processor 90 can be a CPU (Central Processing Unit). The processor 90 can also be other general-purpose processors, DSP (Digital Signal Processor), ASIC (Application Specific Integrated Circuit), FPGA (Field-Programmable Gate Array) or other programmable logic devices, discrete gates or transistor logic devices, discrete hardware components, etc. The general-purpose processor can be a microprocessor, or the processor can be any conventional processor or the like.

The storage 91 can be an internal storage unit of the electronic apparatus 9 in some embodiments such as a hard disk or a memory of the electronic apparatus 9. In other embodiments, the storage 91 can also be an external storage apparatus of the electronic apparatus 9, such as a plug-in hard disk, an SMC (Smart Media Card), an SD (Secure Digital) card, a Flash Card, etc. arranged on the electronic apparatus 9. Further, the storage 91 can also include both the internal storage unit and an external storage apparatus of the electronic apparatus 9. The storage 91 is configured to store an operating system, an application program, a BootLoader, data, and other program, such as program codes of the computer program, etc. The storage 91 can also be configured to temporarily store data that has been output or will be output.

It should be noted that information interaction, execution process, and other contents between the above devices/units are based on the same idea as the method embodiment of the present application. For specific functions and technical effects thereof, refer to the method embodiment section. Details are not described herein again.

It should be clearly understood by the person skilled in the art that, for convenience and conciseness of description, only divisions of the above functional units and modules are described by taking as an example. In practical application, the above functional allocation can be completed by different functional units and modules according to actual needs, that is, an internal structure of the device is divided into different functional units or modules to complete all or part of the functions described above. Each functional unit and module in the embodiment can be integrated into one processing unit. Each unit can exist physically alone. Two or more units can be integrated into one unit. The integrated unit can be realized in a form of a hardware or a software functional unit. In addition, specific names of each functional unit and module are only for the convenience of distinguishing each other, and are not used to limit the scope of protection of the present application. For a specific working process of the unit and the module in the above system, refer to the corresponding process in the above method embodiment. Details are not described herein again.

The above embodiments are intended for describing instead of limiting the technical solutions of the present invention. Although the present application is described in detail with reference to the above embodiments, the person skilled in the art should understand that modifications to the technical solutions described in the above embodiments can be made or equivalent replacements can be made to some technical features thereof. And these modifications or replacements do not make the essence of the corresponding technical solutions depart from the spirit and scope of the technical solutions of the embodiments of the present application, and should be included in the scope of protection of this application.

What is claimed is:

1. A LiDAR controlling method for controlling a LiDAR, wherein the LiDAR comprises a laser emitting array and a laser receiving array, and the method comprises:

in a measurement period, determining an emitting group to be started in the measurement period from a laser emitting array, wherein the emitting group comprises at least two emitting units, and physical positions of the at least two emitting units meet a condition of no optical crosstalk;

controlling the at least two emitting units to emit laser beams asynchronously based on a preset rule;

controlling a receiving unit group of the laser receiving array corresponding to the emitting group to receive laser echoes formed after the laser beams are reflected by a target object; and when at least two emitting groups are determined in the measurement period, controlling the at least two emitting groups to emit the laser beams asynchronously based on the preset rule, wherein controlling the receiving unit group of the laser receiving array corresponding to the emitting group to receive the laser echoes comprises controlling the receiving unit group of the laser receiving array corresponding to each of the at least two emitting groups respectively to receive the laser echoes.

2. The LiDAR controlling method according to claim 1, wherein the controlling the at least two emitting units to emit laser beams asynchronously based on the preset rule comprises:

according to a time coding sequence corresponding to one of the at least two emitting units that is for a $K^{th}$ emission, controlling the emitting unit of the $K^{th}$ emission to emit a laser beam at a first corresponding time, wherein K is an integer greater than or equal to 1; and after a first preset duration threshold expires, according to a time coding sequence corresponding to one of the at least two emitting units that is for a $(K+1)^{th}$ emission, controlling the emitting unit for the $(K+1)^{th}$ emission to emit a laser beam at a second corresponding time.

3. The LiDAR controlling method according to claim 2, wherein a method for determining a time coding sequence corresponding to any one of the emitting units in the emitting group comprises:

based on a first preset sequence, generating a series of pseudo-random sequences via a linear feedback shift register to obtain a plurality of pseudo-random sequences;

determining an autocorrelation function of each of the plurality of pseudo-random sequences;

determining, according to the autocorrelation functions and from the plurality of pseudo-random sequences, a pseudo-random sequence whose autocorrelation coefficient is less than a first specified threshold; and selecting one pseudo-random sequence from the determined pseudo-random sequence as the time coding sequence corresponding to any one of the emitting units.

4. The LiDAR controlling method according to claim 1, wherein the controlling the at least two emitting groups to emit the laser beams asynchronously based on the preset rule comprises:

sequentially controlling each of the at least two emitting groups to emit the laser beams according to a preset emitting timing sequence, wherein an emitting time of a first emitting unit of each of the at least two emitting groups in a same measurement period has an emitting time interval of a second preset duration threshold.

5. The LiDAR controlling method according to claim 1, wherein the physical positions of the at least two emitting groups meet the condition of no optical crosstalk, and the controlling the at least two emitting groups to emit the laser beams asynchronously based on the preset rule comprises:

controlling each of the at least two emitting groups to emit laser beams in parallel, wherein the emitting units in a same emitting order in the at least two emitting groups emit laser beams based on time coding sequences corresponding to the emitting units in the same emitting order, and a cross-correlation coefficient between the time coding sequences corresponding to the emitting units in the same emitting order in adjacent emitting groups is less than a second specified threshold.

6. The LiDAR controlling method according to claim 1, wherein a physical positional relationship of the at least two emitting units is determined based on power, an angle of view, and a detection distance of each of the at least two emitting units.

7. The LiDAR controlling method according to claim 1, wherein the controlling the at least two emitting groups to emit the laser beams asynchronously based on the preset rule includes:

sequentially controlling each of the at least two emitting groups to emit the laser beams according to a preset emitting timing sequence, where an emitting time of a first emitting unit of each of the at least two emitting groups in a same measurement period has an emitting time interval of a second preset duration threshold.

8. A LiDAR controlling device for controlling a LiDAR, wherein the LiDAR comprises a laser emitting array and a laser receiving array, and the LiDAR controlling device comprises:

a determining module, configured to determine, in a measurement period, an emitting group to be started in the measurement period from the laser emitting array, wherein the emitting group comprises at least two emitting units, and physical positions of the at least two emitting units meet a condition of no optical crosstalk;

a first control module, configured to control the at least two emitting units to emit laser beams asynchronously based on a preset rule; and a second control module, configured to control a receiving unit group of the laser receiving array corresponding to the emitting group to receive laser echoes formed after the laser beams are reflected by a target object.

9. An electronic apparatus, comprising a storage, a processor, and computer program that is stored in the storage and capable of running on the processor, wherein the processor implements a LiDAR controlling method for controlling a LiDAR when executing the computer program, and wherein the LiDAR comprises a laser emitting array and a laser receiving array, and the method comprises:

in a measurement period, determining an emitting group to be started in the measurement period from a laser emitting array, wherein the emitting group comprises at least two emitting units, and physical positions of the at least two emitting units meet a condition of no optical crosstalk;

controlling the at least two emitting units to emit laser beams asynchronously based on a preset rule;

controlling a receiving unit group of the laser receiving array corresponding to the emitting group to receive laser echoes formed after the laser beams are reflected by a target object; and when at least two emitting groups are determined in the measurement period, controlling the at least two emitting groups to emit the laser beams asynchronously based on the preset rule, wherein controlling the receiving unit group of the laser receiving array corresponding to the emitting group to receive the laser echoes comprises controlling the receiving unit group of the laser receiving array corresponding to each of the at least two emitting groups respectively to receive the laser echoes.

* * * * *